July 3, 1934.  E. P. FLEMING ET AL  1,964,727
UTILIZATION OF GASEOUS FUEL IN BLAST FURNACE OPERATIONS
Original Filed Oct. 30, 1931
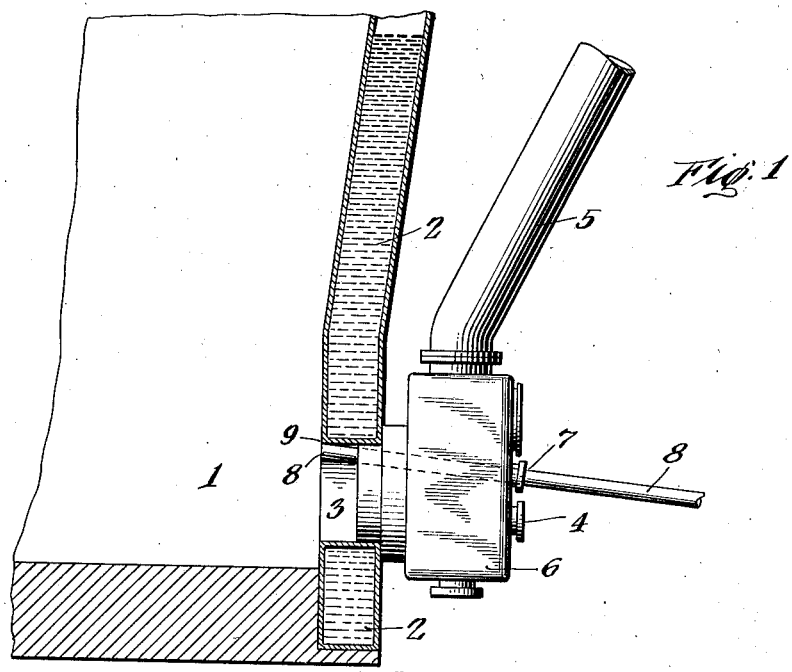
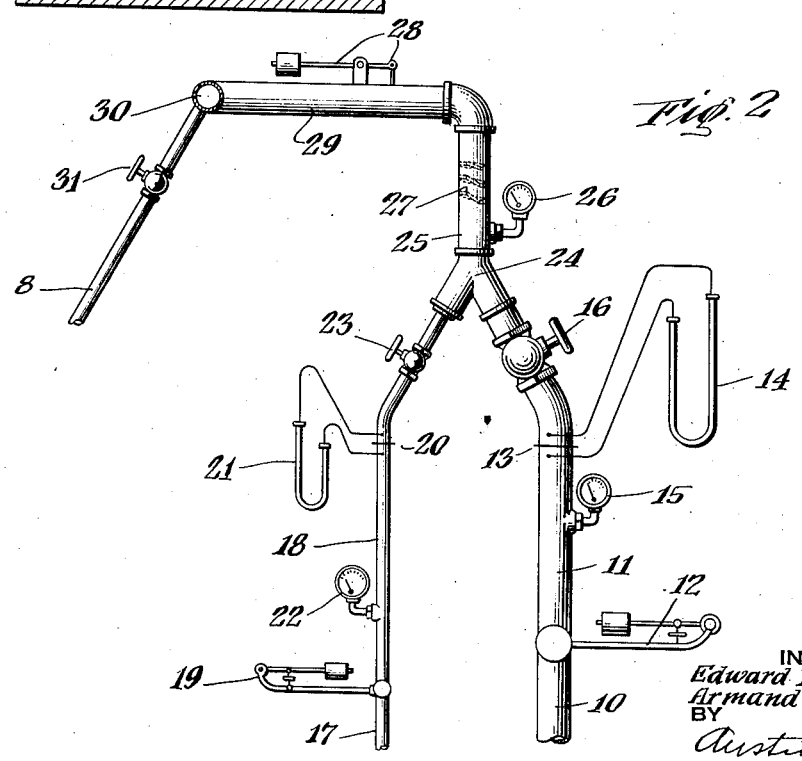
INVENTORS
Edward P. Fleming
Armand L. Labbe
BY
Austin & Dix
ATTORNEYS Patented July 3, 1934

1,964,727

UNITED STATES PATENT OFFICE

1,964,727

UTILIZATION OF GASEOUS FUEL IN BLAST FURNACE OPERATIONS

Edward P. Fleming and Armand L. Labbe, Salt Lake City, Utah, assignors to American Smelting & Refining Company, New York, N. Y., a corporation of New Jersey Application October 30, 1931, Serial No. 572,078
Renewed September 28, 1933

11 Claims. (Cl. 75—17)

This invention relates to a method of and apparatus for operating metallurgical furnaces. The invention more specifically relates to a new and novel method of introducing a combustible gaseous fuel into blast furnaces and suitable apparatus therefor.

Many attempts have been made to utilize gaseous fuels in reducing the amount of coke necessary in smelting operations but such attempts have heretofore been uniformly unsuccessful in producing a process of commercial value.

We have discovered a new method and apparatus for the introduction of gaseous fuels into blast furnaces whereby gas is successfully burned and the amount of coke necessary for normal operation is reduced approximately 25% to 50% depending, of course, on the character of the charge and the particular type of furnace used. Our invention may be successfully employed in a variety of furnaces of which the copper blast furnace, lead blast furnace, iron foundry furnace and iron blast furnace are specific examples.

Among other important features, our invention comprehends introducing a predetermined mixture of gas and air into the tuyères of a blast furnace at a velocity higher than the velocity of the tuyère air blast. By this method we find it possible to maintain a constant, efficient, localized zone of combustion in the path of the air blast. The high velocity of the combustion mixture forces said mixture through the stream of relatively low velocity air blast and maintains the fuel efficiency of the mixture. Perfect ignition is maintained as the combustion mixture enters the porous furnace charge but at the same time sufficient velocity is secured to prevent air or inert gases from diluting the combusting gas mixture.

There is, of course, a limit to the amount of coke which may be replaced by gas in view of the requirement of fixed carbon and carbon monoxide for the reduction of metals from their ores. But until such point is reached, it is found that the substitution of gas results in a better reduction. This is true because of the localized gas combustion in the furnace whereby the regular air blast is preheated. This high temperature at the tuyère zone increases the production of CO from $CO_2$ gas as the equilibrium existing in the reaction of $CO+O_2$  $CO_2$ and the percentage of $CO_2$ converted to CO varies directly with the increase of temperature.

The localization of high temperatures at the tuyère zone is particularly desirable, not only on account of the beneficial effect on reduction, but because it also materially improves the physical condition of the furnace. It is advantageous to promote these high temperatures either by preheating the air in the gas-air mixture or by using oxygen enriched air in the mixture.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a diagrammatic sectional view of a blast furnace at the tuyère level; and Fig. 2 is a diagrammatic plan view of one type of apparatus suitable for forming the combustion mixture.

Our invention may be practised with any standard type of blast furnace. The apparatus consists of a means for mixing gas and air, means for distributing the gaseous fuel to the tuyères, e. g., a bustle pipe, and tubes for introducing the fuel to the charge preferably from the upper portion of the tuyère. In the accompanying drawing, which represents in detail one type of apparatus suitable for practising our invention, 1 represents generally the smelting zone in a blast furnace. Through the water jacket 2 of said furnace extend a plurality of ordinary air blast tuyères 3 (only one shown) from tuyère boxes 6 (one shown). The ordinary air blast is supplied to the tuyère through pipe 5. Extending through the outside wall of box 6, through a suitable connection 7 is nozzle 8.

In operation, the normal air blast is introduced through 5 and passes through tuyère 3 to the furnace charge. A combustible mixture of gas and air, previously mixed, enters through nozzle 8 parallel to the path of the air blast and enters the charge at point 9 near the top of the tuyère.

The air-gas nozzle 8 may be entirely removed without in any way interfering with the operation of the furnace and in the construction shown in Figure 1 it does not interfere with cleaning or punching the tuyères through peep-hole 4. Further, the nozzle can be either projected inside of the furnace or pulled back several inches into the tuyère without affecting the proper combustion of the air-gas mixture, although we have found that a better combustion is obtained when the air-gas mixture is delivered to the top of the tuyère as indicated by 9.

In connection with the proper mixing of gas and air prior to introduction into the tuyère zone, attention is directed to Figure 2 which is an apparatus suitable for such purpose. Such apparatus comprises an air main 10 and gas main 17 which successively and respectively lead to or are connected with automatic regulators 12 and 19, constant pressure pipes 11 and 18, orifice plates 13 and 20, manometers 14 and 21 and valves 16 and 23.

A common header 24 connects pipe 25 with pipes 11 and 18 and a spiral mixing coil 27 is installed in pipe 25. Gage 26 and safety valve 28 are connected to pipe 25, which pipe leads to bustle pipe 30. Suitable valves 31 (one shown) control the flow of fuel mixture to nozzles 8 (one shown).

In operation, in a specific instance air at approximately 5 lbs. pressure is supplied through the air main 10 and maintained at a constant pressure in pipe 11 by the automatic regulator 12. The rate of air used is measured by the orifice plate 13 and manometer 14. The gage 15 is installed between the manometer 14 and constant pressure regulator 12. Valve 16 regulates the volume of air entering the mixture.

In a similar manner combustible gas is supplied to main 17 at a pressure of 5 lbs. and maintained at constant pressure in pipe 18 by constant pressure regulator 19. The orifice plate 20 and manometer 21 measure the rate of gas used and gage 22 indicates the pressure in pipe 18. The volume of gas entering the mixture is regulated by the valve 23. Between the automatic regulators 12 and 19 and air regulating valves 16 and 23, the air and gas are maintained at precisely the same pressure.

Air through valve 16 and gas through valve 23 are introduced into the common header or Y-connector 24 and then into pipe 25. The spiral 27 insures a proper mixing of the air and gas in pipe 25. The function of the safety valve 28 is to release the mixture to the atmosphere whenever the pressure exceeds a certain point, say 4 lbs.

The object of maintaining the air in 11 and gas in 18 at the same pressure, say 5 lbs., is to provide a uniform gas mixture irrespective of the variation in pressure in the pipe leading to the tuyères. The reason for a lower pressure in pipe 25, say 4 lbs., is to prevent the gas mixture backing into the mains 10 and 17 with danger of explosion. After leaving the spiral 27, the gas-air mixture passes through pipe 29 to bustle pipe 30 from which it is distributed to the tuyères by the nozzles 8 (one shown), valves 31 being provided in each nozzle pipe by which the flow of gas from bustle pipe 30 to the individual tuyère may be regulated.

While an apparatus for preparing the gas-air mixture has been described in detail, it should be understood that we do not limit our invention to this particular type of equipment. Various types of blowers which deliver an intimate mixture of air and a combustible gas in definite proportions may be used. It is, of course, essential that the ratio of the gas-air mixture be under accurate control and also important to note that the said mixture can be injected through the nozzle at approximately 4–5 pounds pressure.

The following specific data regarding nozzle velocity and gas-air ratio are given only as illustrations and are not to be construed as limiting the invention, as obviously, many alterations, substitutions and variations by those skilled in the art are within the spirit and broad scope of the invention.

Nozzle velocity

To illustrate the relative velocities of the gas-air mixture and air blast proper, the following specific example is given:

In standard practise the air volume on a furnace having 20 four-inch tuyères is 5600 cu. ft. per minute @ 70° F. or 280 cu. ft. per tuyère. A 250 ton daily smelter charge with 14% coke will require 35 tons of coke each day. To replace 25% of the coke with natural gas containing 900 B. t. u. per cu. ft., requires replacing 12 lbs. of coke each minute which is equivalent to 162,000 B. t. u. or 9 cu. ft. of natural gas per tuyère per minute.

In using a ¾ inch nozzle pipe in the tuyère, we have discovered a gas-air ratio of 1:6 to be the most efficient which makes a total air gas mixture of 63 cu. ft. per minute with a nozzle velocity, under 4 lbs. pressure, or 265 ft. per second.

The volume of air blast in the tuyère will be 280 cu. ft. minus 54 cu. ft. or 226 cu. ft. of free air or a velocity of 36 ft. per second at 3 lbs. pressure. This then makes the ratio between the tuyère velocity and nozzle velocity approximately 1:7.5.

Gas-air ratio

We have also found that with variations in the volume of ordinary tuyère air, a corresponding change is desirable in the gas-air ratio, if the best results are to be secured. As a specific example we have found a gas-air ratio of 1:5.5 is the most desirable for a volume of 300 cu. ft. per minute per each four-inch tuyère. Where the volume of tuyère air per each four-inch tuyère is reduced to 200 cu. ft. per second, the best results are obtained with a gas-air ratio of 1:6.5.

It may readily be seen from an examination of the foregoing description and disclosure, that our invention possesses many advantages in smelting operations. Among others we have found that a better reduction is obtained—e. g. in a lead blast furnace, the waste slag contains less lead.

Other advantages of our invention which, in part at least, result from the localization of the high temperature of the tuyère zone are: better mechanical settling of metal values because of the hotter furnace products; an increase in the smelting rate; fewer difficulties from shaft and crucible accretions, and operation of the furnace with an increased latitude of economical slag composition. It will be observed also that the stream of gas-air mixture being introduced at a higher pressure and nozzle velocity than the tuyère air tends to maintain a definite stream through the tuyère air permitting it to impinge against the adjacent portion of the charge thus creating and maintaining a definite localized region or zone of combustion resulting in advantageous higher temperatures. This stream of gas air mixture at higher pressure also tends to penetrate more deeply toward the core of the charge whereby more rapid, efficient and complete smelting is promoted.

What is claimed is:

1. The method of burning combustible gas in the body of a charge in a blast furnace which comprises mixing regulated amounts of a combustible gas and air to produce a combustible gas-air mixture of desired proportions, passing the aforesaid gas-air mixture through a regular tuyère blast supply of air and into the body of the charge in the furnace whereby ignition and combustion of the thus introduced gas-air mixture is effected within the body of said charge.

2. The method of burning combustible gas in the body of a charge in a blast furnace which comprises mixing regulated amounts of a combustible gas and air to produce a combustible gas-air mixture of desired proportions and introducing the aforesaid gas-air mixture into the body of the charge in the furnace at a velocity greater than the velocity of the tuyère air blast whereby ignition and combustion of the thus introduced gas-air mixture is effected within the body of said charge.

3. The method of burning combustible gas in the body of a charge in a blast furnace which comprises mixing regulated amounts of a combustible gas and air to produce a combustible gas-air mixture of desired proportions, conducting the aforesaid gas-air mixture to a region in proximity to the peripheral portion of the charge in the furnace and then introducing said gas-air mixture at said region into the body of the charge at a velocity greater than the velocity of the tuyère air blast whereby ignition and combustion of the thus introduced air mixture is effected within the body of said charge.

4. The method of burning combustible gas in the body of a charge in a blast furnace which comprises mixing regulated amounts of a combustible gas and air to produce a combustible gas-air mixture of desired proportions, establishing a supply of air via a tuyère leading to the furnace, introducing the aforesaid gas-air mixture into the body of the charge in the furnace at a pressure and velocity higher than the pressure and velocity of the tuyère air blast whereby ignition and combustion of the thus introduced gas-air mixture is effected within the body of said charge.

5. The method of burning combustible gas in the body of a charge in a blast furnace which comprises establishing a tuyère air blast leading to a charge within the blast furnace, mixing regulated amounts of a combustible gas and air to produce a combustible gas-air mixture, conducting the aforesaid gas-air mixture to a region in proximity to the tuyère air blast and then introducing the said gas-air mixture into the body of the charge in the furnace at a velocity greatly in excess of the velocity of the tuyère air blast whereby ignition and combustion of the thus introduced gas-air mixture is effected within the body of said charge.

6. In the smelting of ores in a blast furnace that improvement which comprises burning a combustible gas-air mixture within the body of a charge in a furnace prior to substantial contamination by the regular air blast supply whereby higher temperatures are produced and better operating conditions are established.

7. In the smelting of ores in a blast furnace that improvement which comprises forcing a combustible mixture of natural gas and air through a regular tuyère air blast while maintaining the said combustible mixture at a substantially constant composition and introducing same into the body of a charge in a blast furnace to effect a combustion of said combustible mixture within the body of said charge and to produce higher operating temperatures in said charge.

8. In the smelting of ores in a blast furnace that improvement which comprises injecting a combustible gas-air mixture into the body of a charge in a blast furnace and burning said combustible gas-air mixture within the body of said charge in a furnace before said gas-air mixture is contaminated with air from the regular tuyère blast.

9. In the smelting of ores in a blast furnace that improvement which comprises projecting a combustible gas-air mixture into the body of the charge through a stream of air from an independent air blast supply said mixture consisting of pre-heated air and gas and burning said pre-heated combustible gas-air mixture within the body of said charge in a furnace whereby higher temperatures are produced and better operating conditions are established.

10. In the smelting of ores in a blast furnace that improvement which comprises injecting a combustible gas-air mixture into the body of a charge in a blast furnace, said mixture consisting of oxygen enriched air and gas, and burning said oxygen enriched gas-air mixture within the body of said charge in a furnace while said mixture still retains its approximate initial composition.

11. In the smelting of ores in a blast furnace that improvement which comprises introducing a combustible mixture of natural gas and air into the body of a charge in a blast furnace at a velocity greater than the velocity of the tuyère air blast of said furnace to effect a combustion of said combustible mixture with the body of said charge and to produce higher operating temperatures in said charge.

EDWARD P. FLEMING.
ARMAND L. LABBE.